United States Patent Office 3,509,253
Patented Apr. 28, 1970

3,509,253
ALUMINUM CHLORIDE-ALUMINUM CHLORO-
HYDROXIDE COMPLEX ANTIPERSPIRANT
COMPOSITION
Saul A. Babbin, Henrietta, N.Y., assignor to Pennwalt
Corporation, a corporation of Pennsylvania
No Drawing. Filed Feb. 28, 1967, Ser. No. 619,159
Int. Cl. A61k 7/00, 9/00
U.S. Cl. 424—47
2 Claims

ABSTRACT OF THE DISCLOSURE

A solution of aluminum chloride and an alcohol soluble complex compound obtained by reacting aluminum chloride or aluminum chlorhydroxide with an alcohol having at least two hydroxy groups or with a glycol monoether, in an aliphatic monohydroxy alcohol such as ethanol, water and a halogenated hydrocarbon propellant. Preferable additions to the above ingredients are dipropylene glycol, urea, tartaric acid, hexachlorophene and perfume. The composition is prepared by cooling the propellant to —40° F. to —60° F. and mixing in the other ingredients with stirring while maintaining the temperature at not above 5° F.

The invention relates to aerosol antiperspirant compositions comprising aluminum chloride, and to their preparation.

Aluminum chloride, a highly effective antiperspirant, has been incorporated as an active ingredient in many antiperspirant and deodorant compositions now on the market such as for example in aqueous alcohol compositions applied with a dabber applicator. However aluminum chloride has not been used in the popular aerosol sprays due to its highly corrosive characteristics which harm the containers and valve components, and also because in systems in which attempts were made to use it in the aluminum chloride would crystallize and clog the actuator valve system.

Furthermore it was not believed that stable aerosol systems could be obtained if aluminum chloride were present.

An object of this invention is to provide a stable aerosol composition comprising aluminum chloride which remains soluble in the aerosol and which does not crystallize and clog the actuator valve system of the container.

The compositions of this invention are eminently suitable for use in the glass container described in application Ser. No. 563,502 filed July 7, 1966 now U.S. Patent No. 3,347,423 and assigned to the assignee of the present application.

An aerosol composition which accomplishes the above object and which has other advantages which will become apparent as this description progresses consists essentially of a solution of aluminum chloride, an alcohol soluble complex compound obtained by reacting an aluminum compound of the formula $Al_2Cl_{6-x}(OH)_x$ where $x$ is a number from zero to five, with a hydrolytic agent from the groups consisting of alcohols having at least two hydroxy groups and glycol monoethers, in an aliphatic monohydroxy alcohol, water and a halogenated hydrocarbon propellant. Preferable additions to the above ingredients are glycols, and polyoxyalkylene glycols such as dipropylene glycol, to aid solubility of the aluminum chloride and complex compound in the alcohol and propellant, ethoxylated lanolin which serves both as an emollient and enhances stability, tartaric acid as a sequestering agent for metallic impurities, urea as a fabric buffer to prevent scorching against ironing, also to inhibit hydrolysis of acetyl copolymers in aerosol valves when exposed to high temperatures, hexachlorophene as an antibacterial agent, and a perfume to mask objectionable body odor and alcohol vapors.

Complex componnents of the type designated above, and processes of making them are described in Slater et al. Canadian Patent 718,932. The hydrolitic agents used in making the complex compounds include polyhydroxy alkyl compounds, e.g. glycols such as ethylene glycol, propylene glycol, and 1,4-butanediol and the like. Aliphatic ether glycols having one or more ether linkage in the carbon chain (e.g. polyoxyalkylene glycols having a molecular weight up to 500, preferably to about 200) are suitable, such as diethylene glycol, dipropylene glycol, triethylene glycol, and tetraethylene glycol, for examples. Included also are materials such as 1,3-butanediol, glycerol and diglycerol; 1,2,6-hexanetriol, 1,2,4-butanetriol and, trimethylolpropane and others disclosed in said Canadian patent 718,932.

To prepare the complex compounds in accordance with the Canadian patent the hydrolytic agent and an appropriate aluminum compound such as aluminum chloride or aluminum chlorohydroxide compound, prepared for example according to the procedure in Australian patent 150,410 or U.S. Patent 2,571,030 are contacted in the proportions desired in the final product, in the presence of sufficient water, if necessary, to dissolve all of the aluminum compound. Conveniently the water is removed by evaporation at room temperature or below, or at an elevated temperature up to approximately 80° C. At any of these temperatures, reduced pressure for example a pressure of 25 mm. Hg may be employed to speed removal of water. In the use of such complex compounds with aluminum chloride in the aerosol composition of this invention it is not necessary to remove all of the water. The reaction product is soluble in alcohol and water and can be crystallized from alcohol e.g. ethanol, or from water, or can be precipitated from alcohol or water solutions by the addition of a non-polar solvent such as ether or alcohol.

A variety of products having astringent properties and useful with aluminum chloride in my composition can be produced when the aluminum compound $$Al_2Cl_{(6-x)}(OH)_x$$

is reacted with the hydroxylic component in molar ratios varying between about 6:1 and about 1:6, preferably between about 5:1 and 1:5. If the alcohol is in a molar excess, as compared with a 1:1 molar ratio, liquid products are obtained. The solid products preferred for use as astringents in antiperspirant compositions are prepared from reaction mixtures having a molar ratio of aluminum to alcohol between about 3:1 and about 1:1. Compositions having particularly good properties for use in my antiperspirant compositions are obtained by reacting the aluminum compound with the alcohol in a molar ratio between about 1.7:1 and about 2.8:1, optimally about 2.3:1.

Within these preferred ranges, the alcohol solubility of the product is maximized in those compounds prepared by reacting more than 4 molar parts of the aluminum compound with 1 molar part of alcohol. In other reaction products, a slightly lower alcohol solubility is observed.

If products are prepared by reacting more than 1 molar part of aluminum compound per molar part of alcohol, it is convenient to permit the alcohol and aluminum compound to stand for a time, e.g. overnight, in the presence of water before heating. This extended standing brings about a more thorough solvation of the aluminum compound and promotes a more efficient synthesis.

A complex of the above general type, and which has been found to be especially satisfactory with aluminum chloride in the aerosol composition of my invention is the reaction product of aluminum chlorhydroxide with propylene glycol. This alcohol soluble complex is sold under the trademark Rehydrol ASC and is described in the recent catalogue entitled "Rehydrol® ASC" of the Reheis Chemical Company Division of Armour Pharmaceutical Company.

The term "alcohol soluble aluminum chlorhydroxide-propylene glycol complex" as used in this specification and claims means an aluminum chlorhydroxy complex in which the water molecules normally coordinated to the aluminum in the aluminum chlorhydroxy complex have been displaced by the alcoholic oxygens of the glycol resulting in a relatively less polar complex of low water content. It thus may be considered to be a polynuclear (Werner type) coordination type complex of basic aluminum chloride and propylene glycol. Infra red data indicate that some of the polyol is hydrogen bonded to the aluminum moiety as O—H—O bonds involving both the primary and secondary alcohol groups of the glycol and the hydroxy groups of the aluminum chlorhydroxy complex resulting in cyclic structures.

The ratio of aluminum to chlorine in the complex may be between 4–7 atoms of aluminum for each 3 atoms of chlorine, but preferably is 2 atoms of Al to 1 atom of Cl.

An alcohol soluble aluminum chlorhydroxidepropylene glycol complex which has been found particularly satisfactory is the aluminum chlorhydroxide-propylene glycol complex made from $(Al_2(OH)_5Cl)$ in which the water molecules in $(OH)_5$ normally coordinated to the aluminum have been displaced by the alcoholic oxygens of propylene glycol. The aluminum chlorhydroxide-propylene glycol complex thus formed has a ratio of Al to Cl of 2 to 1.

A product consisting of the above aluminum chlorhydroxide-propylene complex, sold under the trademark Rehydrol ASC, is a white, free-flowing, hydroscopic, amorphorus powder with an average particle size of 50 microns. The solid Rehydrol ASC contains 93–100% of the aluminum chlorhydroxide complex which is made up of about 75% by weight of the aluminum chlorhydroxide moiety. It is soluble in anhydrous, denatured ethanol and ethanol containing water, such as up to 10% water.

The following Tables I and II give product specifications:

TABLE I

Product specifications $Al_2O_3$—36.0% minimum
Chloride—12.5% minimum
Al:Cl atomic ratio—1.90:1.00 to 2.00:1.00
Water—7.0% maximum
pH (30% w./w. in SD 40 anhydrous alcoholic solution)—2.5 minimum
pH (30% w./w. water solution)—4.0 minimum
Sulfate $(SO_4)$—0.05% maximum
Iron (Fe)—150 p.p.m. maximum
Heavy metals (as Pb)—20 p.p.m. maximum
Arsenic (as As)—2 p.p.m. maximum

TABLE II

Solubility

The solubility of Rehydrol ASC in some typical solvents is as folows:

| Solvent: | Percent solubility at 25° C. (w./w.) |
|---|---|
| Anhydrous ethanol (SD 40) | 50 |
| Water | 50 |
| Anhydrous methanol | 68 |
| Glycerin | 45 |
| Dimethyl formamide | 42 |
| n-Butyl alcohol | 16 |
| n-Hexyl alcohol | 1.9 |

The infrared curve on Rehydrol ASC as compared to propylene glycol is given below:

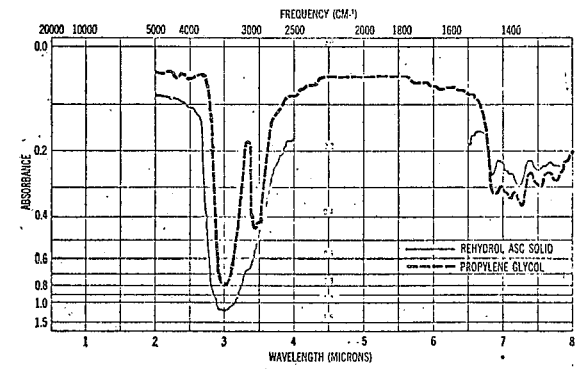

Figure 2. Infrared Curve Rehydrol ASC Solid

The above graph is that shown in the above mentioned Rehydrol ASC catalogue.

The following infrared curve was made from infrared tests run in assignee's laboratory on Rehydrol ASC solid using a Perkin-Elmer infrared spectrophotometer, Model 257, with KBr 0.25% purity. This infrared curve gives additional information from that shown in the catalogue, the other being submitted because of the comparison with propylene glycol.

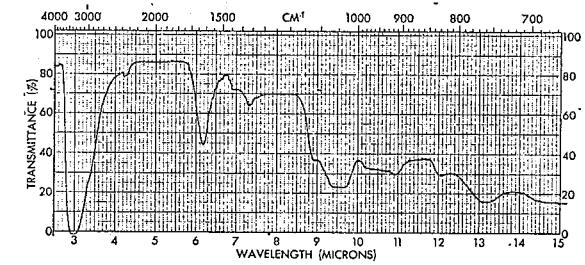

The aliphatic monohydric alcohol acts as a solvent for complex compound and the propellant, and with water also for the aluminum chloride. Such alcohols include methanol, n-propanol, isopropanol, and butanol. Ethanol is the preferred alcohol for antiperspirant compositions. The ethyl alcohol used may be anhydrous or ordinary 95% ethyl alcohol containing a denaturant suitable for cosmetic use, such as a minor amount of brucine sulfate or tertiary butyl alcohol.

Dipropylene glycol is particularly suitable for aiding solubility. Propylene glycol and glycerine are also helpful, as is the class of alkylene glycols and glycol ethers in general.

Ethoxylated lanolin is a suitable emollient. Ethoxylated lanolin which is a partially acetylated lanolin and contains 11 mols of ethylene oxide (Solulan 98) has been found to be especially useful in aiding stability of the solution.

Suitable propellants include liquified, normally gaseous halogenated hydrocarbons. These include such compounds as halogenated methane, ethane, propane and mixtures thereof. Other halogenated hydrocarbons which have been found to be particularly suitable for use as propellants in accordance with the present invention are the fluorocarbon propellants such as those sold under the trademark Freon, including octafluorocyclobutane, dibromotetrafluoromethane, and the fluorochloroalkanes including monochlorodifluoroethane, monochlorodifluoromethane, dichloromonofluoroethane, dichlorodifluoromethane, dichlorotetrafluoroethane, trichloromonofluoromethane, difluoroethane, etc. In some instances it may be desirable to use a combination of two or more of the liquified, normally gaseous, materials as a propellant in order to achieve a suitable pressure within the container and impart such desired properties as stability, ease of delivery, particle size, etc., to the compositions.

The ingredients of the aerosol composition are used in such amounts as to have a stable solution in which the solids do not precipitate or crystallize from the solution. Thus there is no clogging of the actuator valve system of the container, and little if any corrosion of metal in contact with the composition.

My invention is not limited to the discovery of suitable proportions of aluminum chloride and complex compound to provide a stable aerosol composition, but is largely based on my discovery that stable aerosol compositions can be made containing aluminum chloride and that aluminum chloride aids in the solubility and stabilization of the complex compound in the aerosol composition.

The following Table III gives a specific formulation of an aerosol composition which has been found commercially satisfactory and some preferred and suitable proportions in percent by weight of ingredients used in such aerosol compositions, it being understood that other active and solvent ingredients may be used as set forth above and that the range of proportions given in the table shall not be regarded as a limit of operability.

TABLE III

| Ingredients | Specific | Preferred range | Suitable range |
|---|---|---|---|
| $AlCl_3$ | 1.20 | 1–5 | 1–10 |
| Aluminum chlorhydroxidepropylene glycol complex (Rehydrol ASC) | 1.95 | 1–3 | 1–5 |
| Urea | 0.845 | 0–1 | 0–3 |
| Dipropylene glycol | 1.95 | 1–3 | 0–5 |
| Ethoxylated lanolin (Solulan 98) | 0.13 | .1–1 | 0–3 |
| Tartaric acid | .13 | 0–.2 | 0–1 |
| Hexachlorophene | .13 | 0–.2 | 0–1 |
| Fragrance | 0.2 | 0–1 | 0–3 |
| Ethanol | 55.4 | 45–65 | 40–70 |
| Water | 3.1 | 1–5 | 1–10 |
| Dichlorodifluoromethane (Freon 12) | 14.0 | 10–20 | 10–100 |
| Dichlorotetrafluoroethane (Freon 114) | 21.0 | 15–30 | 0–30 |

EXAMPLE I

The specific formulation of Table III is made as follows:

First the dipropylene glycol, fragrance, tartaric acid solution (1% with ethanol), hexachlorophene, ethoxylated lanolin and a small quantity anhydrous ethanol are blended together at 70° F. without the utilization of heat. This mixture is designated as "L." 5963 pounds of anhydrous ethanol are placed in a stainless steel tank to which are added 313 pounds of purified water with mixing for about five minutes. 91 pounds of urea are then added in small amounts with continued mixing at about 70° F. until complete dissolution is attained. Next 140 pounds of aluminum chloride are added in the same manner as the urea, mixing for 15 minutes or until completely dissolved. 210 pounds of alcohol soluble aluminum chlorhydroxide propylene glycol complex (Rehydrol ASC) are then added in the same manner as the urea and aluminum chloride, mixing for 15 minutes after all has been added, and continue mixing and recirculating until all has dissolved. Next, 283 pounds of mixture "L" is added to the above with mixing for 30 minutes at a temperature of about 70° F.

The entire mixture is chilled to 0° F. to −20° F., filtered, and the clear solution maintained at −5° F. to −20° F. This cold solution is then added with mixing to the propellant solution which is at a temperature of −40° F. to −60° F., and thorough mixing by stirring carried out. The temperature is not allowed to exceed 5.0° F. during the mixing operation. At no time is the premix, or concentrate, or finished aerosol heated so as to drive off water.

The above example is illustrative only of a suitable process and is not intended as a limitation of the invention. Other methods may be used as will be apparent to those skilled in the art, such as, for example, using pressure so as to mix and stir at temperatures above −40° F. to −60° F. such as 0° F.

What I claim is:

1. An aerosol composition consisting in approximate parts by weight:

| | |
|---|---|
| Aluminum chloride | 1 |
| Alcohol soluble aluminum chlorohydroxide-propylene glycol complex obtained by reacting an aluminum compound of the formula $AlCl_{6-x}(OH)_x$ where $x$ is an integer from zero to five with propylene glycol in a molar ratio of aluminum compound to glycol of between 1.7:1 and 2.8:1 | 2 |
| Urea | 1 |
| Dipropylene glycol | 2 |
| Ethanol | 55 |
| Hexachlorophene | .1 |
| Water | 3 |
| Tartaric acid | .1 |
| Ethoxylated lanolin containing 11 mols of ethylene oxide | .1 |
| Fragrance | .2 |
| Dichlorodifluoromethane | 14 |
| Dichlorotetrafluoroethane | 21 |

2. An aerosol antiperspirant composition consisting essentially in parts by weight:

| | |
|---|---|
| Aluminum chloride | 1–5 |
| Alcohol soluble aluminum chlorhydroxide-propylene glycol complex obtained by reacting an aluminum compound of the formula $Al_2Cl_{6-x}(OH)_x$ where $x$ is an integer from zero to five with propylene glycol in a molar ratio of aluminum compound to glycol of between 6:1 and 1:6 | 1–3 |
| Urea | 0–1 |
| Dipropylene glycol | 1–3 |
| Ethoxylated lanolin containing 11 mols of ethylene oxide | .1–1 |
| Tartaric acid | 0–.2 |
| Hexachlorophene | 0–.2 |
| Ethanol | 45–65 |
| Water | 1–5 |
| Dichlorodifluoromethane | 10–20 |
| Dichlorotetrafluoroethane | 15–30 |

References Cited

UNITED STATES PATENTS

| | | | |
|---|---|---|---|
| 3,211,620 | 10/1965 | Henkin et al. | 424—68 |
| 3,235,458 | 2/1966 | Messina | 424—68 |
| 3,359,169 | 12/1967 | Slater et al. | 424—68 |

ALBERT T. MEYERS, Primary Examiner

D. R. ORE, Assistant Examiner